United States Patent [19]
Marcyan

[11] 3,923,220
[45] Dec. 2, 1975

[54] MOTOR BIKE STABILIZER

[76] Inventor: Stanley T. Marcyan, 515 W. Windsor Road, Glendale, Calif. 91204

[22] Filed: May 24, 1974

[21] Appl. No.: 473,131

[52] U.S. Cl............... 224/42.03 B; 403/43; 403/47
[51] Int. Cl.² .......................................... B60R 9/08
[58] Field of Search ............. 224/42.03 B; 214/450; 248/354 R, 354 S; 403/43–47, 56, 77, 141–143, 319; 280/512

[56] References Cited
UNITED STATES PATENTS

| | | | |
|---|---|---|---|
| 2,125,611 | 8/1938 | Hennicke | 280/512 |
| 2,576,222 | 11/1951 | Hill | 224/42.03 B |
| 2,694,582 | 11/1954 | Reside | 403/141 X |
| 3,171,627 | 3/1965 | Tapley et al. | 248/354 S |

*Primary Examiner*—Robert G. Sheridan
*Attorney, Agent, or Firm*—Sellers and Brace

[57] ABSTRACT

A stabilizer device for anchoring a motor bike rigidly captive in a carrying position crosswise of a motor vehicle with the bike wheels seated in carrier sockets attached to the vehicle chassis. Quickly separable ball and socket couplings are provided at the opposite ends of the stabilizer with the ball of one attached to the vehicle body and the ball of the other clampable to the bike handle bar or the like component.

3 Claims, 4 Drawing Figures

MOTOR BIKE STABILIZER

This invention relates to devices for securing an article to the rear of a motor vehicle, and more particularly to a rugged versatile stabilizer device for use in anchoring a motor bike or the like article to the rear of a motor vehicle in a simple and highly versatile manner.

The use of the very popular motor bikes in urban areas is seriously handicapped and hazardous owing to congested traffic conditions and totally inadequate opportunities to utilize the potentials of a bike. Accordingly, it is a common practice to transport the bike out of urban areas for use in open and rugged country where the bike can be enjoyed unhampered by pedestrian and vehicle traffic. This necessitates the use of some means for attaching the bike securely and safely to a truck, trailer or the rear of a passenger vehicle. Special transport trailers have been developed to meet this need but these must be certified for such use, registered and licensed at considerable expense and such trailers involve storage problems when not in use. Proposals have also been made for bike transport accessories securable to the chassis of a vehicle but these occupy an objectionable amount of space, are costly and interfere with access to the storage space from the rear of the vehicle.

In order to obviate these and other disadvantages and shortcomings of prior expedients for transporting motor bikes, there is provided by this invention an inexpensive versatile stabilizer readily installed in various ways on vehicles of many types and providing a quickly attached and detached stabilizing connection between the transport vehicle and the upper part of a motor bike. The stabilizer comprises a readily extendable and contractable tie rod equipped with ball and socket couplings at its ends one of which is anchorable to some part of a vehicle body and the other of which is anchorable to the frame, handlebars or other component of a motor bike. Each coupling includes a spring pressed jaw cooperating with the ball and socket to lock the coupling closed and including a safety keeper safeguarding against any possibility of the coupling opening unintentionally.

It is therefore a primary object of the present invention to provide a rugged stabilizer bar equipped with fast-action couplings at its opposite ends and readily installable between a vehicle body and a motor bike to stabilize and anchor the bike in place during transport.

Another object of the invention is the provision of a stabilizer readily adjustable in length and equipped with ball and socket couplings at either end one of which is mountable on the upper part of a motor bike and the other of which is mountable on the body of a vehicle thereby to support the bike in a secure upright position for transport over the highway.

These and other more specific objects will appear upon reading the following specification and claims and upon considering in connection therewith the attached drawing to which they relate.

Referring now to the drawing in which a preferred embodiment of the invention is illustrated:

Figure 1:
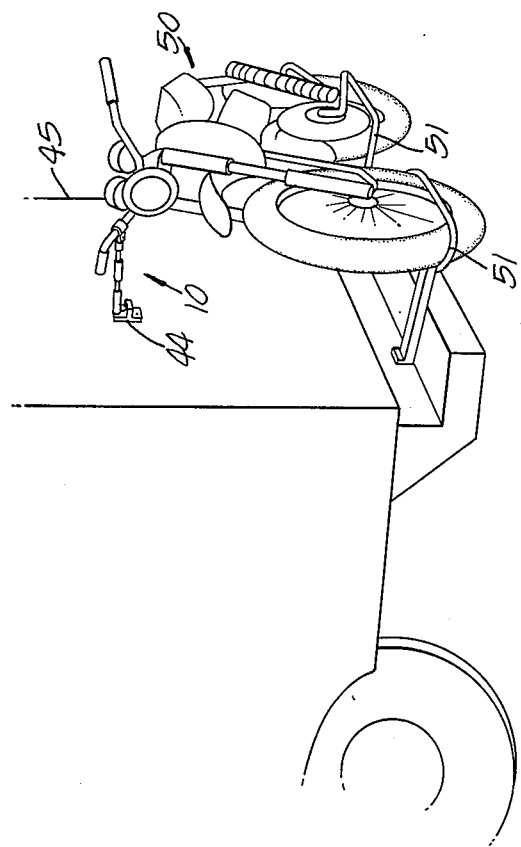
FIG. 1 is a perspective view of the rear of a passenger vehicle showing the invention stabilizer in use to support a motor bike across the rear of a passenger vehicle.
Figure 2:
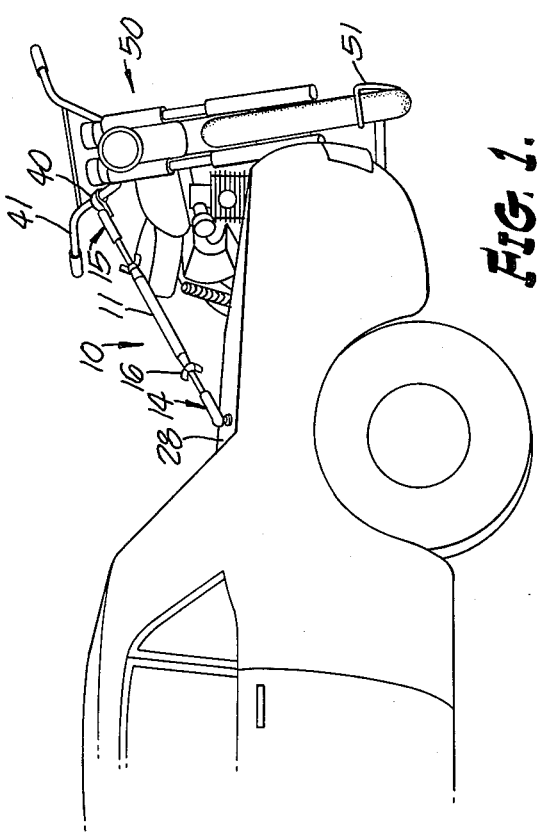
FIG. 2 is a view showing the invention stabilizer in use to support a motor bike across the rear end of a house trailer.
Figure 3:
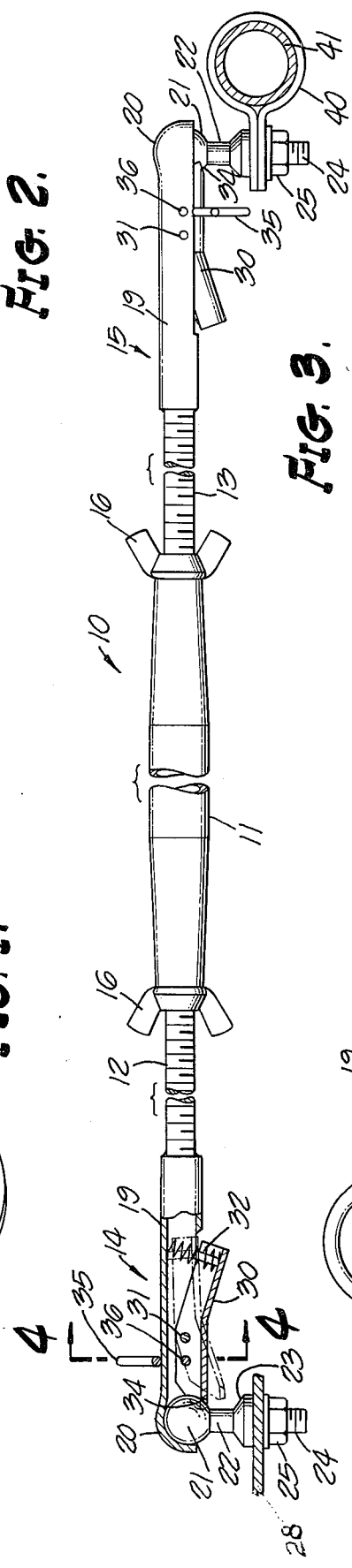
FIG. 3 is a side elevational view of an enlarged scale of the stabilizer per se as illustrated in FIG. 1.

The stabilizer device, designated generally 10, typically comprises a turn buckle 11 having left and right hand threaded bores at its opposite ends mating with the correspondingly threaded shanks 12,13 the ends of which are welded to ball and socket couplings 14,15. As here shown, the turn buckle has a tubular main body of any suitable length depending upon the manner in which the stabilizer is to be used. As employed in FIG. 1, the stabilizer is relatively long whereas in FIG. 2 it is relatively short. The threaded shanks 12 and 13 are equppped with winged lock nuts 16,16 which serve to lock the turn buckle in any desired adjusted position.

As herein shown, the ball and socket couplings 14, 15 are identical and a description of one will suffice for both. Coupling 14 has a channel-shaped main body stamped from heavy gauge sheet metal and terminates at one end in a tubular section welded to the threaded shank 12. The opposite end of the coupling body is provided with a socket 20 having a spherical seat for the ball portion 21 of the coupling. This ball is integral with a cylindrical shank 22 having an annular stiffening enlargment 23 about its midlength. The remainder of shank 22 is threaded as indicated at 24 and is provided with an assembly nut 25 for clamping the ball component to some rigid object, such as a portion of the vehicle body 28 forward of the access closure to the storage compartment of the vehicle.

Coupling 14 is provided with a locking jaw 30 of channel shape in cross-section and having a loose fit between the sidewalls of the main body 19 of the coupling. Jaw 32 is held pivotably assembled to member 19 by a pivot pin 31, and is normally urged to its closed position illustrated in full lines by a compression spring 32. The other end of jaw 30 is notched at 34 to embrace the adjacent portion of coupling ball 21 and cooperates with socket 20 in holding the ball 21 captive within this socket so long as the jaw is closed. However, when the jaw is pivoted to its dotted line position, the notched end 34 is displaced away from the ball and permits the coupling to be lifted away from the ball.

Figure 4:
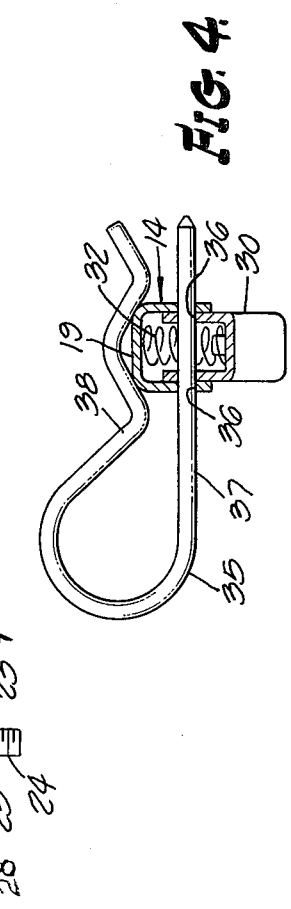
FIG. 4 is a fragmentary cross-sectional view taken along line 4—4 on FIG. 3.

The locking jaw of the coupling is held positively locked in its closed position by a U-shaped safety keeper pin 35 best shown in FIG. 4. For this purpose, the main bodies of coupling 14 and locking jaw 30 are provided with aligned openings 36 to one side of pivot pin 31. When the locking jaw is in its normal closed position, openings 36 are in alignment with one another and have a loose sliding fit with the straight leg 37 of keeper 35. The other leg 38 of the keeper is of serpentine shape and suitably shaped to straddle and engage the main body of the coupling to hold the keeper firmly in assembled position in the manner made clear by FIG. 4. The keeper is preferably made of stiff spring stock and must be forcibly inserted and withdrawn from its fully assembled position to release the locking jaw for opening movement in opposition to spring 32.

Coupling 15 at the right hand end of the stabilizer is constructed in the same manner as described above, but its threaded shank 24 is assembled to a clamping band 40 encircling some part of the motor bike such as the handle bar 41. Clamp 40 and the ball portion 21 of coupling 15 may remain firmly anchored to the motor bike at all times and likewise ball 21 of coupling 14 may remain permanently installed on the body 28 of the vehicle or to a bracket 44 permanently anchored to the rear of a house trailer or the like 45.

The weight of motor bike 50 may be supported on any type of vehicle in any conventional manner as by brackets 51,51 suitably secured rigidly to the rear of the chassis and having pockets embracing and seating the lower portions of the front and rear bike wheels in well known manner.

To mount the bike 50 for transport on a passenger car the front and rear wheels of the bike 50 are seated in pockets 51 and the bike is steadied in an upright position while the stabilizer coupling is closed. This is accomplished by manually depressing the locking jaw 30 of coupling 15 until the bar 21 carried by the handle bar is seated in socket 20. The jaw is then released and spring 32 acts to hold the jaw closed. Thereafter, coupling 14 is similarly assembled over the ball 21 fixed to the rear central portion of the vehicle body. Each of the safety keepers 35 is inserted through holes 36 in each coupling to lock jaw 30 closed. The weight of the motor bike is now supported in brackets 51,51 and anchored securely in an upright position in these brackets by stabilizer 10. Acceleration, deceleration and braking of the car can be performed in the usual manner without risk of the bike becoming dislodged or moving in any direction.

At the destination or point of use of the bike, the bike is easily dismounted from carrying position simply by withdrawing the keeper 35 from coupling 15, depressing the handle end of locking jaw 30 and lifting the outer end of the stabilizer away from ball 21. This having been done, the bike is free for lifting out of pockets 51. While the bike is in use, the stabilizer may remain attached to the rear of the transport vehicle. Alternatively, the stabilizer may be detached from the vehicle simply by removing the other keeper 35 and depressing the locking jaw. When ready to reload the bike, the user simply operates the stabilizer couplings in the manner described previously to restore the bike to its former safe transport position.

While the particular motor bike stabilizer herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A stabilizer device for detachably anchoring a motor bike rigidly stabilized crosswise of the rear of a motor vehicle while being transported, said device comprising a pair of ball coupler sub-units one of which includes means for rigidly mounting the same on the rear of a motor vehicle and the other of which includes means for rigidly mounting the same on the upper part of a motor bike, an elongated rigid stabilizer member having a spherical surfaced socket at each end thereof opening laterally through one side thereof and sized to seat over the ball of a respective one of said ball coupler sub-units to hold a motor bike rigidly stabilized in an upright position crosswise of the rear of a motor vehicle, a manually operable elongated locking jaw pivotally connected to each end of said stabilizer member with the locking end thereof normally positioned to engage the ball of a respective one of said ball couplers to hold the same assembled in a respective one of said spherical sockets, a pair of U-shaped spring keepers one leg of which is insertable through aligned holes at each end of said stabilizer and an adjacent portion of each of said locking jaws to lock said jaws positively against opening so long as said stabilizer member is assembled to said ball coupler sub-units, and said stabilizer member being quickly and fully released from each of said rigidly mounted coupler sub-units by simply withdrawing said spring keepers from said aligned openings and pivoting said locking jaws outwardly away from contact with the adjacent ball of said ball coupler sub-units.

2. A quickly detachable stabilizer device as defined in claim 1 characterized in that said stabilizer member comprises a tubular sleeve provided with oppositely pitched threads internally of its opposite ends, said spherical sockets being formed in one end of a pair of generally tubular housings each having a threaded shank fixed to the other end thereof, and said threaded shanks being mateable with a respective one of the threaded ends of said tubular sleeve and adjustable therealong to vary the length of said stabilizer member.

3. A stabilizer device as defined in claim 1 characterized in that said keepers each have one leg thereof deformed and shaped to embrace and resiliently grip a juxtaposed position of said stabilizer member to retain said keepers in assembled position when the other leg of said keeper is assembled through said aligned openings.

* * * * *